Oct. 3, 1950

R. A. KNAUS 2,524,450

SELF-LOCKING STAND

Filed Nov. 18, 1946

INVENTOR.
Rudolph A. Knaus
BY Victor J. Evans & Co.
ATTORNEYS

Oct. 3, 1950 R. A. KNAUS 2,524,450
SELF-LOCKING STAND
Filed Nov. 18, 1946 2 Sheets-Sheet 2
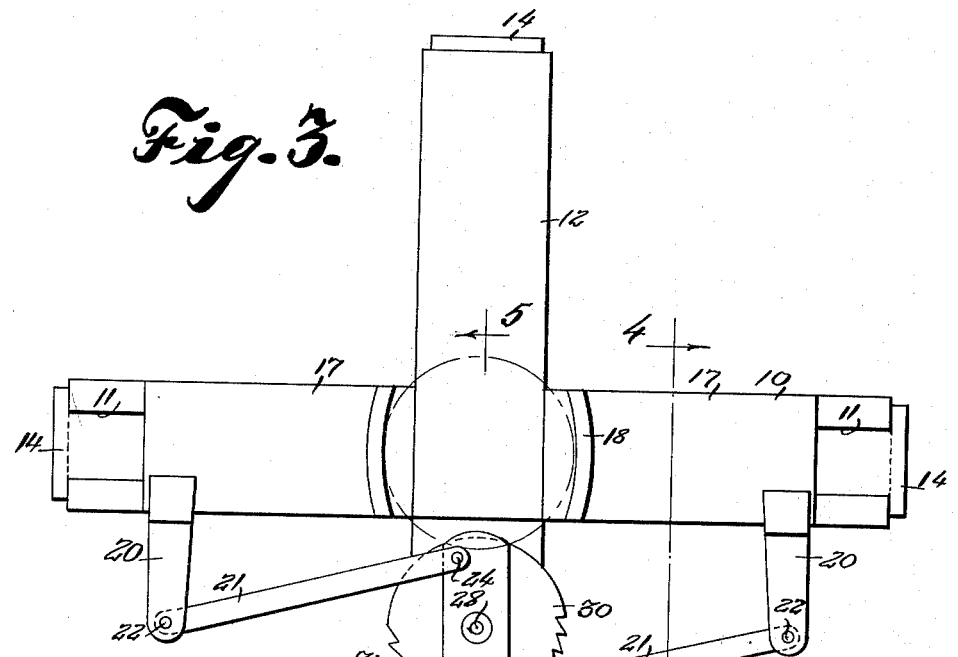
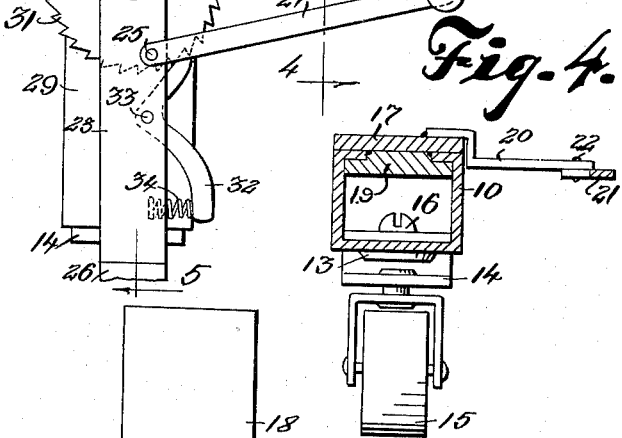
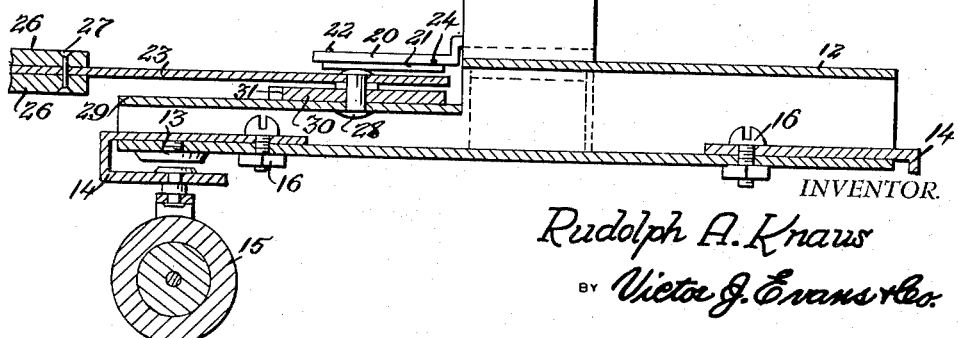
INVENTOR.
Rudolph A. Knaus
BY Victor J. Evans & Co.
ATTORNEYS Patented Oct. 3, 1950

2,524,450

UNITED STATES PATENT OFFICE 2,524,450

SELF-LOCKING STAND

Rudolph A. Knaus, Euclid, Ohio

Application November 18, 1946, Serial No. 710,719

1 Claim. (Cl. 248—44)

This invention relates to a self-locking stand that may be used for Christmas trees, flags, photographer's lights, signs, cameras, blackboards or similar objects.

An object of the invention is to provide a stand that is adaptable to any diameter, simple to operate, light in weight, durable in use and efficient in operation.

With the above and other objects and advantages in view, the invention consists of the novel details of construction, arrangement and combination of parts more fully hereinafter described, claimed and illustrated in the accompanying drawings in which:

Figure 3 is the same, in open position;

Figure 4 is a sectional view on the line 4—4 of Figure 3 and

Figure 5 is a sectional view on the line 5—5 of Figure 3.

Figure 1:
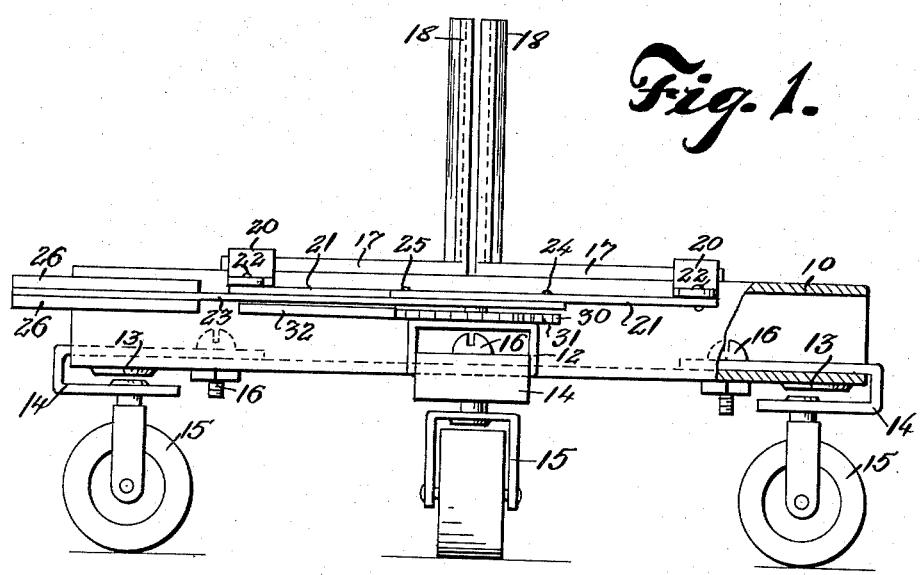
Figure 1 is an elevational view of an embodiment of the invention.

Referring more in detail to the drawings, the reference numeral 10 comprises the main body which is square in cross section, hollow and provided with a longitudinal slot 11 in the top thereof. A secondary member 12 similar to the body is secured to the body to form a cross-shaped base which provides the main support for the articles as mentioned above.

The ends of the body 10 and member 12 are provided with feet 13 which may be of rubber or similar material to protect the surface on which the base is placed, or a U-shaped bracket 14 carrying a caster wheel 15 may be secured to each end of the members 10 and 12 below the feet 13 by bolts 16, to provide a portable support if desired.

Mounted for sliding movement on the body 10 are the jaw plates 17 having the upstanding opposed arcuate shaped jaws 18.

T-shaped runners 19 secured to the under surface of the plates 17 within the body 10 engage the slot 11 therein to guide and retain the plates on the body 10. Each plate, at its outer end, is provided with a right angularly extending arm 20 which has connection rods 21 pivoted to the outer ends thereof at 22. The opposite ends of the rods 21 are pivoted to a handle 23 at 24 and 25 respectively, and the handle is provided at its outer ends with grips 26 secured thereto by rivets 27.

The handle is pivotally mounted on a pin 28 mounted on a reduced portion 29 of the member 12, and also mounted on the pin below the handle in fixed relation to the portion 29 is a plate 30, having teeth 31 on half of its outer periphery to form a rack for engagement with the pawl 32 pivotally mounted at 33 on the handle 23. A coiled spring 34 engages the outer end of the pawl and the handle 23 retains the pawl in engagement with the rack.

All of the parts are secured together by spot welding, making a light, strong and durable structure.

Figure 2:
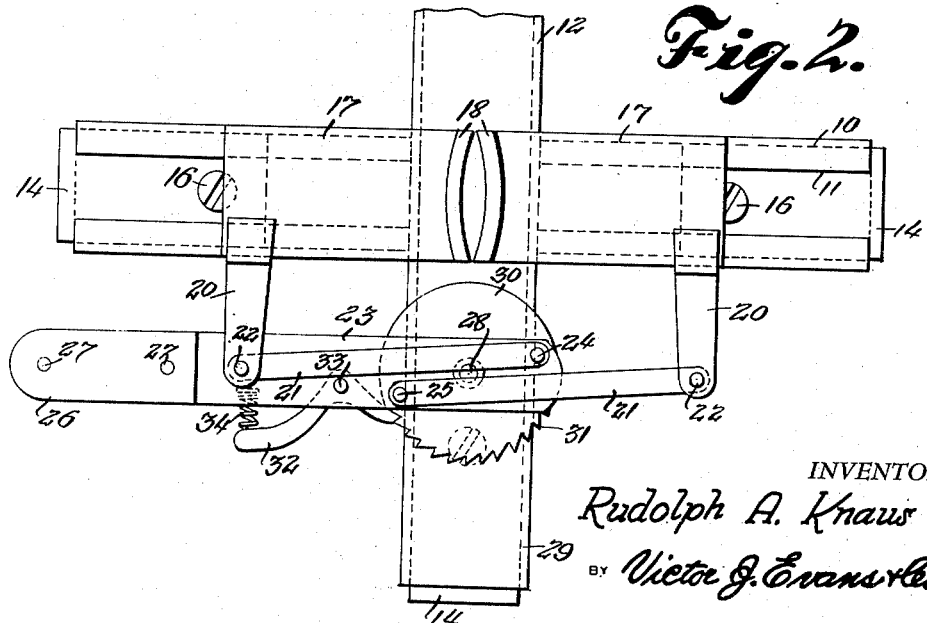
Figure 2 is a top plan view in closed position.

In use, the handle is pivoted on the pin 28 to open the jaws 18 as shown in Figure 3 or close them, as shown in Figure 2. When the jaws are open, an article can be placed therebetween, and when the jaws are closed on the article by the handle, the pawl will engage the rack to lock the jaws in supporting position depending upon the diameter of the article to be supported.

It is believed that from the foregoing description, the operation and construction of the invention will be apparent to those skilled in the art, and it is to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

A device of the character described comprising a pair of elongated rectangular shaped hollow members which are joined at their centers to form a cross shaped base, and one of said members having a longitudinally extending slot therein, supporting jaws, T-shaped guide runners on the lower surface of said jaws slidably mounted in the slot in the latter member of said base, said guide runners adapted to retain and guide the jaws in their movement on said base, an outwardly extending arm on the outer end of each jaw, a connecting rod pivotally connected at one end to the outer end of each jaw, a plate portion rigidly connected to the other of said first said members, a pin mounted centrally of the plate in vertical relation thereto, a handle pivotally mounted on said pin and the opposite ends of said connecting rods pivotally connected to said handle in eccentric relation to each other, teeth on a portion of the outer edge of said plate, a pawl pivotally mounted on said handle for engagement with said plate, and said handle upon the movement thereof on its pivot adapted to open and close said jaws to support an article on said base and the coaction of said pawl with said teeth adapted to hold said jaws in closed position.

RUDOLPH A. KNAUS.

REFERENCES CITED

The following references are of record in the file of this patent:

UNITED STATES PATENTS

| Number | Name | Date |
|---|---|---|
| 367,175 | Bachlott | July 26, 1887 |
| 654,768 | Thoburn | July 31, 1900 |
| 1,155,383 | Tischer | Oct. 5, 1915 |